United States Patent
Huang et al.

(10) Patent No.: US 11,510,151 B2
(45) Date of Patent: Nov. 22, 2022

(54) MULTI-TRANSCEIVER WIRELESS COMMUNICATION DEVICE CAPABLE OF ADEQUATELY ADJUSTING PARAMETERS FOR BLUETOOTH TRANSCEIVER

(71) Applicant: REALTEK SEMICONDUCTOR CORPORATION, Hsinchu (TW)

(72) Inventors: Ya-Hsueh Huang, Kaohsiung (TW); Yi-Lin Li, Hsinchu (TW)

(73) Assignee: REALTEK SEMICONDUCTOR CORPORATION, Hsinchu (TW)

(*) Notice: Subject to any disclaimer, the term of this patent is extended or adjusted under 35 U.S.C. 154(b) by 133 days.

(21) Appl. No.: 17/082,061

(22) Filed: Oct. 28, 2020

(65) Prior Publication Data
US 2021/0127336 A1    Apr. 29, 2021

(30) Foreign Application Priority Data
Oct. 29, 2019 (TW) ................................ 108139086

(51) Int. Cl.
*H04W 52/18* (2009.01)
*H04W 72/04* (2009.01)

(52) U.S. Cl.
CPC ....... *H04W 52/18* (2013.01); *H04W 72/0453* (2013.01)

(58) Field of Classification Search
None
See application file for complete search history.

(56) References Cited

U.S. PATENT DOCUMENTS

| | | | |
|---|---|---|---|
| 8,594,150 B1 * | 11/2013 | Husted ................. | H04B 1/7143 |
| | | | 375/135 |
| 8,755,756 B1 | 6/2014 | Zhang et al. | |
| 2019/0123867 A1 * | 4/2019 | Sun ....................... | H04L 5/0058 |
| 2020/0358544 A1 * | 11/2020 | Huang ................. | H04W 72/044 |
| 2022/0028241 A1 * | 1/2022 | Gans .................... | H04L 41/022 |

OTHER PUBLICATIONS

OA letter of the counterpart TW application (appl. No. 108139086) dated Dec. 16, 2020. Summary of the OA letter Claims 1-10 are rejected as being unpatentable over the cited reference in view of the known Bluetooth communicatior protocol techniques.

\* cited by examiner

*Primary Examiner* — Saba Tsegaye
(74) *Attorney, Agent, or Firm* — WPAT, PC

(57) ABSTRACT

Disclosed is a wireless communication device including a wireless transceiver, a Bluetooth (BT) transceiver and a BT controller. The wireless transceiver supports at least one wireless communication standard (e.g., at least one of a series of IEEE 802.11 standards) and executes wireless communication via a wireless channel in a period of time. The BT transceiver executes BT communication via a plurality of BT channels successively in the period of time. The BT controller determines that a central-frequency difference between the wireless channel and a BT channel falls within a frequency interval of N predetermined frequency intervals and thereby controls the BT transceiver to use a set of parameters related to the frequency interval, wherein the set of parameters is one of N predetermined sets of parameters.

15 Claims, 6 Drawing Sheets

MULTI-TRANSCEIVER WIRELESS COMMUNICATION DEVICE CAPABLE OF ADEQUATELY ADJUSTING PARAMETERS FOR BLUETOOTH TRANSCEIVER

BACKGROUND OF THE INVENTION

1. Field of the Invention

The present invention relates to a wireless communication device, especially to a wireless communication device capable of Wireless Local Area Network (WLAN) communication and Bluetooth (BT) communication.

2. Description of Related Art

In a circumstance that a Bluetooth (BT) transceiver and a Wi-Fi transceiver of the same device use the same frequency band (e.g., 2.4 GHz band) to perform communication simultaneously, the two transceivers will interfere with each other, and this will lead to the increase of the transmission error rate. Currently there are several ways to mitigate the interference between the BT transceiver and the Wi-Fi transceiver as follows:

(1) managing the time for the BT transceiver using the frequency band and the time for the Wi-Fi transceiver using the same frequency band according to the exchange of operation states between the BT transceiver and the Wi-Fi transceiver. If the Wi-Fi transceiver makes a request for receiving packets, the BT transceiver will stop transmitting signals. If the BT transceiver makes a request for receiving a high priority packet, the Wi-Fi transceiver will stop transmitting signals. If packets to be received by the BT transceiver can be retransmitted, the BT transceiver will wait for the spare time of the Wi-Fi transceiver and receive the packets in the spare time. The above-mentioned manner has the problem that only one transceiver can transmit/receive signals through the same frequency band at the same time; and this problem drags the throughputs of the two transceivers down.

(2) mitigating the interference in the Wi-Fi transceiver by the signal strength adjustment to the transmitter of the BT transceiver or by the parameter adjustment to the receiver of the BT transceiver. If the BT transceiver is aware that the Wi-Fi transceiver is receiving signals, the BT transceiver will reduce its transmission signal strength to lower its influence on the receiver of the Wi-Fi transceiver. If the BT transceiver is aware that the Wi-Fi transceiver is transmitting signals and probably leading to an interference part of the BT transceiver's received signal, the BT transceiver will reduce its reception sensitivity to prevent the interference part from being amplified excessively. Since the above-mentioned manner perform the constant adjustment to the BT transceiver merely according to whether the Wi-Fi transceiver is receiving/transmitting signals and does not take the degree of interference between the BT transceiver and the Wi-Fi transceiver into consideration, this manner usually lead to the increase of the reception failure rate of a far-end BT device (i.e., the link partner of the BT transceiver) or lead to the degradation of the reception sensitivity of the BT transceiver.

SUMMARY OF THE INVENTION

An object of the present disclosure is to provide a wireless communication device for improving the Bluetooth (BT) communication success rate.

An embodiment of the wireless communication device of the present disclosure includes a wireless transceiver, a Bluetooth (BT) transceiver, and a BT controller. The wireless transceiver is configured to perform wireless communication via a wireless channel in a period of time, in which the wireless transceiver supports at least one wireless communication standard (e.g., at least one standard of multiple IEEE 802.11 standards). The BT transceiver is configured to perform BT communication via a plurality of BT channels successively in the period of time, in which the plurality of BT channels includes a first BT channel and a second BT channel. The BT controller is configured to control the BT transceiver to use one of N sets of parameters if the BT controller determines that during the period of time that the BT transceiver is performing the BT communication via the first BT channel, a difference between a central frequency of the wireless channel and a central frequency of the first BT channel falls within one of N predetermined frequency intervals; and the BT controller is also configured to control the BT transceiver to use one of the N sets of parameters if the BT controller determines that during the period of time that the BT transceiver is performing the BT communication via the second BT channel, a difference between the central frequency of the wireless channel and a central frequency of the second BT channel falls within one of the N predetermined frequency intervals. In this embodiment, the wireless transceiver and the BT transceiver use the same frequency band for communication simultaneously in the period of time, and the number "N" is an integer greater than one.

These and other objectives of the present invention will no doubt become obvious to those of ordinary skill in the art after reading the following detailed description of the preferred embodiments that are illustrated in the various figures and drawings.

DETAILED DESCRIPTION OF THE PREFERRED EMBODIMENTS

The present disclosure includes a wireless communication device (e.g., a mobile phone, a personal computer, a wearable electronic device) capable of adaptively adjusting the parameters of a Bluetooth (BT) transceiver according to the central frequency difference between a wireless channel and a BT channel; and this wireless communication device can improve the BT communication success rate in comparison with the prior arts.

Figure 1:
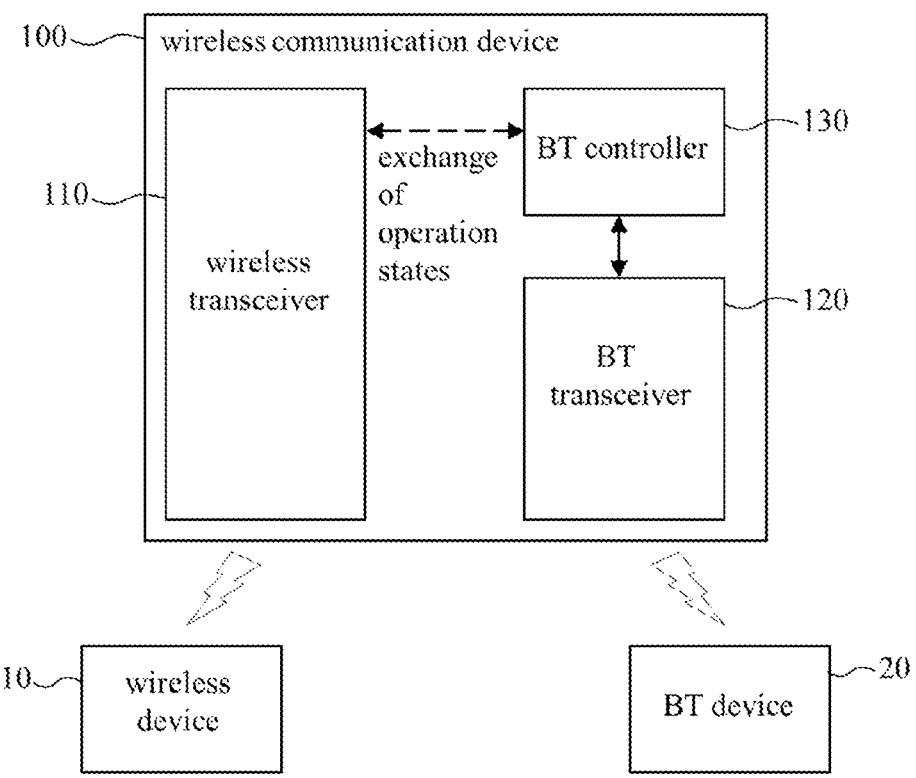
FIG. 1 shows an embodiment of the wireless communication device of the present disclosure.

FIG. 1 shows an embodiment of the wireless communication device of the present disclosure. The wireless communication device 100 of FIG. 1 includes a wireless transceiver 110, a BT transceiver 120, and a BT controller 130. The wireless transceiver 110 is wirelessly connected with a wireless device 10 (e.g., a Wireless Local Area Network (WLAN) device such as an access point (AP)). The BT transceiver 120 is wirelessly connected with a BT device 20 (e.g., BT speaker, or BT headset). In the embodiment of FIG. 1, the BT controller 130 is integrated into the BT transceiver 120, and all of the wireless transceiver 110, the BT transceiver 120, and the BT controller 130 are included in a single integrated chip (IC). In another embodiment, the BT controller 130 is integrated into the BT transceiver 120, the wireless transceiver 110 and the BT transceiver 120 are two separate ICs. In yet another embodiment, the BT controller 130 is set outside the BT transceiver 120, and the wireless transceiver 110, the BT transceiver 120, and the BT controller 130 are separate ICs that are independent of one another.

Figure 2:
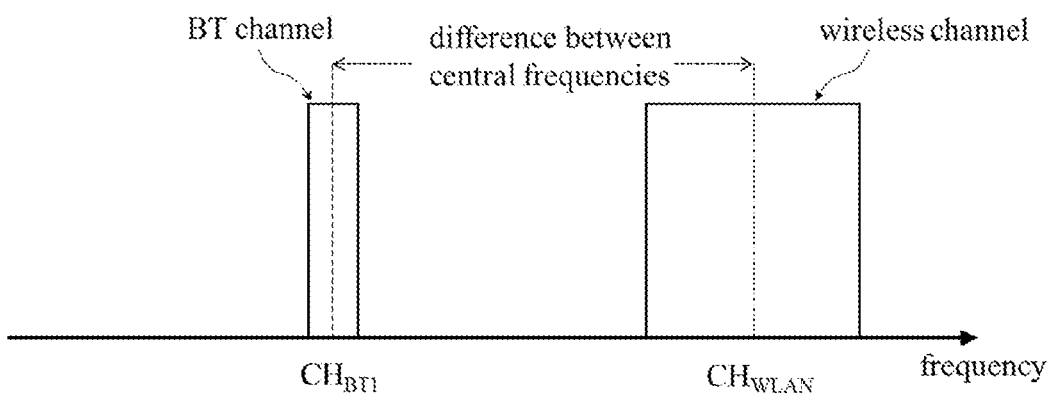
FIG. 2 shows the wireless transceiver and the BT transceiver of FIG. 1 using the wireless channel and the first BT channel for communication respectively.
Figure 3:
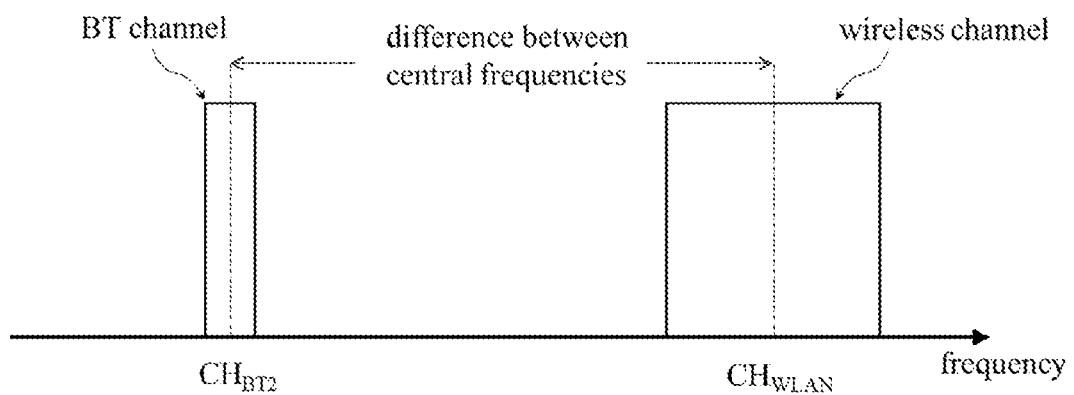
FIG. 3 shows the wireless transceiver and the BT transceiver of FIG. 1 using the wireless channel and the second BT channel for communication respectively.

Please refer to FIGS. 1-3. FIG. 2 shows a wireless channel $CH_{WLAN}$ and a first BT channel $CH_{BT1}$ being respectively used by the wireless transceiver 110 and the BT transceiver 120 of FIG. 1 for communication. FIG. 3 shows the wireless channel $CH_{WLAN}$ and a second BT channel $CH_{BT2}$ being respectively used by the wireless transceiver 110 and the BT transceiver 120 of FIG. 1 for communication. The wireless transceiver 110 is configured to perform wireless communication including a wireless transmission operation and a wireless reception operation via the wireless channel $CH_{WLAN}$ in a period of time, and the wireless transceiver 110 supports at least one wireless communication standard (e.g., at least one standard of multiple IEEE 802.11 standards including 802.11b, 802.11g, 802.11n, and 802.11ac; or a Long Term Evolution (LTE) standard). The BT communication has the feature of frequency hopping and thus the BT transceiver 120 is configured to perform BT communication including a BT transmission operation and a BT reception operation via a plurality of BT channels in order in the period of time, in which the plurality of BT channels includes the first BT channel $CH_{BT1}$ and the second BT channel $CH_{BT2}$. The feature of frequency hopping can be learned from the following literature: Bluetooth SIG Proprietary, "Volume 1, Part A, Section 1.1, 1.2 and Volume 2, Part B, Section 2.6 of Bluetooth Core Specification Version 5.0", Dec. 6, 2016.

Please refer to FIGS. 1-3 again. The BT controller 130 is configured to control the BT transceiver 120 to use an $X^{th}$ set of parameters among N sets of parameters (e.g., each set of the N sets of parameters including the parameter(s) for setting the amplification gain of a BT transmitter of the BT transceiver 120 and/or including the parameter(s) for setting the automatic gain control (AGC) of a BT receiver of the BT transceiver 120) if the BT controller 130 determines that during the period of time that the BT transceiver 120 is performing the BT communication via a current BT channel, a difference between the central frequency of the wireless channel $CH_{WLAN}$ and the central frequency of the first BT channel $CH_{BT1}$ falls within a $P^{th}$ interval of N predetermined frequency intervals; in this circumstance the BT transceiver 120 performs the BT communication via the first BT channel $CH_{BT1}$ in the period of time. The BT controller 130 is also configured to control the BT transceiver 120 to use a $Y^{th}$ set of parameters among the N sets of parameters if the BT controller 130 determines that during the period of time that the BT transceiver 120 is performing the BT communication via the current BT channel, a difference between the central frequency of the wireless channel $CH_{WLAN}$ and the central frequency of the second BT channel $CH_{BT2}$ falls within a $Q^{th}$ interval of N predetermined frequency intervals; in this circumstance the BT transceiver 120 performs the BT communication via the second BT channel $CH_{BT2}$ in the period of time. The number N is an integer greater than one (e.g., N≥3). Each of the numbers P, Q, X, and Y is a positive integer equal to or smaller than the number N. Both the wireless transceiver 110 and the BT transceiver 120 use the same frequency band (e.g., the 2.4 GHz band of Industrial Scientific Medical (ISM) band) to perform communication simultaneously in the period of time while the wireless channel overlaps or does not overlap with any of the plurality of BT channels.

Figure 4:
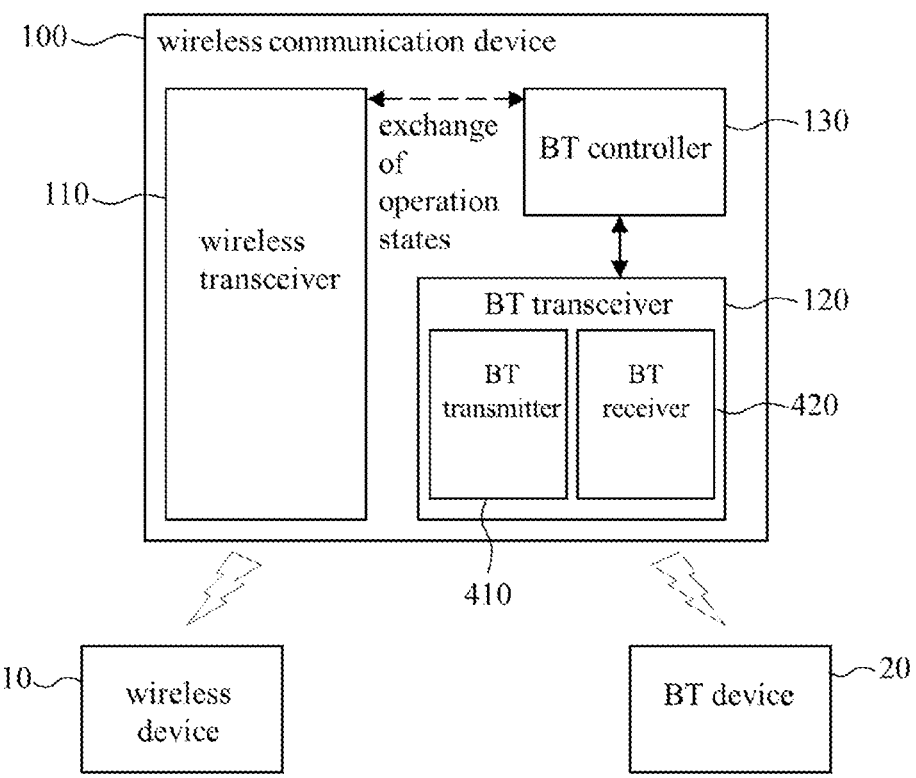
FIG. 4 shows an embodiment of the BT transceiver of FIG. 1.
Figure 5:
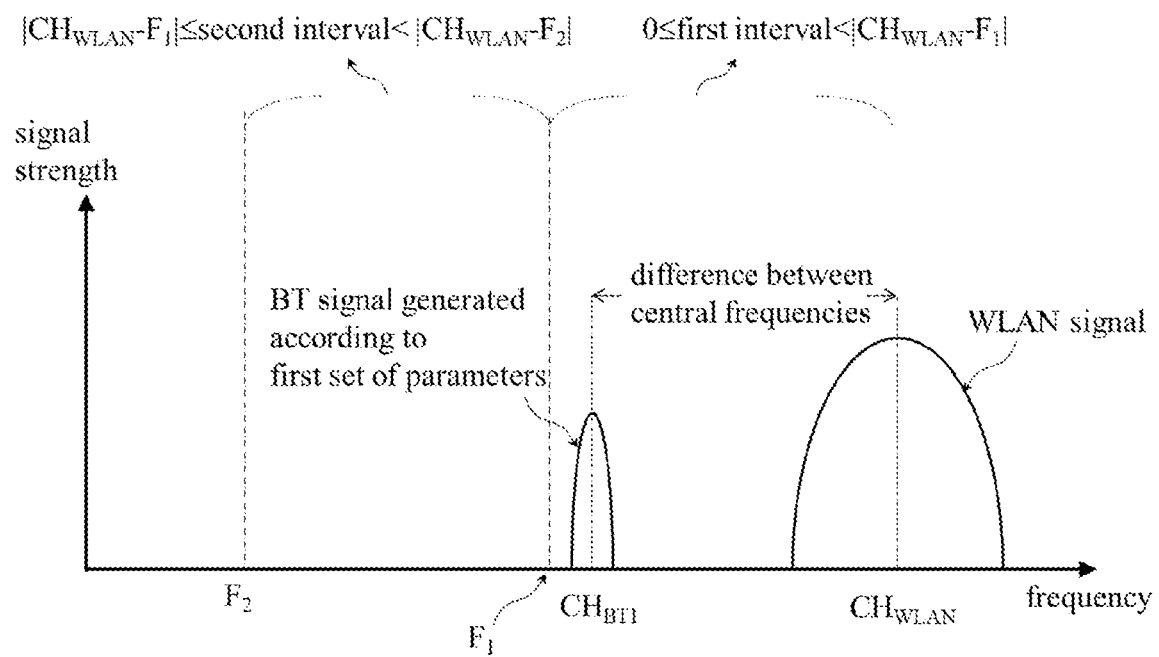
FIG. 5 shows the BT signal strength when the difference between the central frequency of the wireless channel and the central frequency of the first BT channel falls within a first frequency interval.
Figure 6:
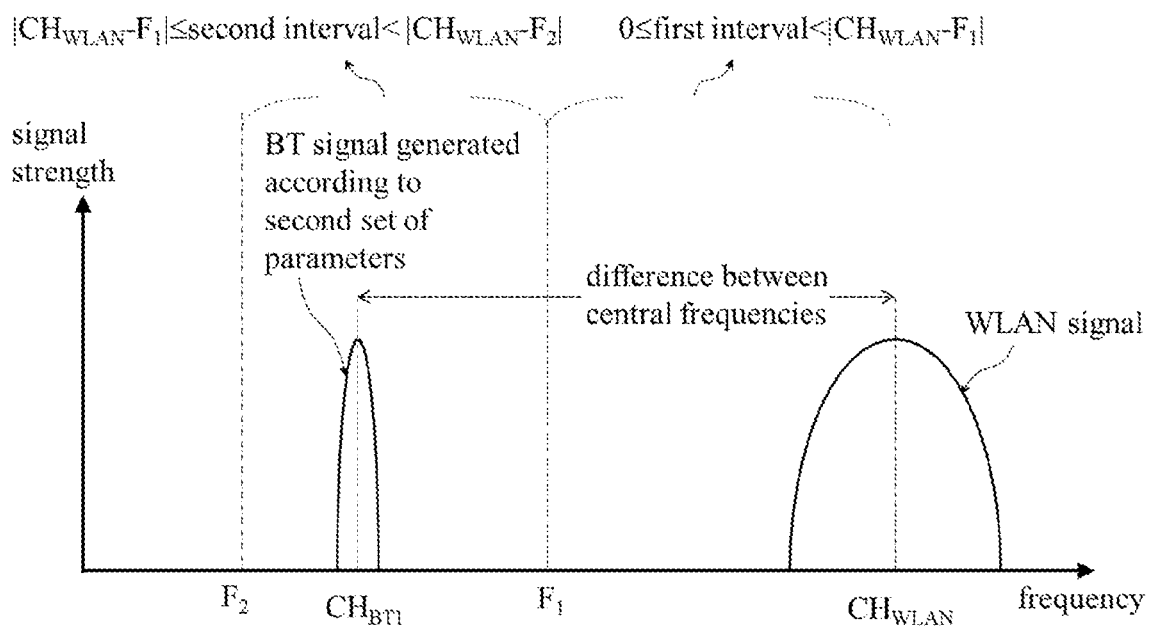
FIG. 6 shows the BT signal strength when the difference between the central frequency of the wireless channel and the central frequency of the first BT channel falls within a second frequency interval.

FIG. 4 shows an embodiment of the BT transceiver 120 including a BT transmitter 410 and a BT receiver 420. Please refer to FIGS. 1, 2, and 4. In regard to the control of BT transmission, if the difference between the central frequency of the wireless channel $CH_{WLAN}$ and the central frequency of the first BT channel $CH_{BT1}$ falls within a first interval of the N predetermined frequency intervals, the BT controller 130 controls the BT transceiver 120, especially the BT transmitter 410 of the BT transceiver 120, to use a first set of parameters (e.g., the parameters for setting the amplification gain of the BT transmitter 410) among the N sets of parameters; and if the difference between the central frequency of the wireless channel $CH_{WLAN}$ and the central frequency of the first BT channel $CH_{BT1}$ falls within a second interval of the N predetermined frequency intervals, the BT controller 130 controls the BT transceiver 120, especially the BT transmitter 410 of the BT transceiver 120, to use a second set of parameters (e.g., the parameters for setting the amplification gain of the BT transmitter 410) among the N sets of parameters. It should be noted that the difference between any frequency in the first interval and the central frequency of the wireless channel $CH_{WLAN}$ is smaller than the difference between any frequency in the second interval and the central frequency of the wireless channel $CH_{WLAN}$ as shown in FIGS. 5-6; in other words, any frequency in the second interval is farther from the central frequency of the wireless channel $CH_{WLAN}$ than any frequency in the first interval is. In addition, a transmission signal strength (as shown in FIG. 5, in which the frequencies F1 and F2 define the first interval and the second interval) of the BT transceiver 120 using the first set of parameters is weaker than a transmission signal strength (as shown in FIG. 6, in which the frequencies F1 and F2 define the first interval and the second interval) of the BT transceiver 120 using the second set of parameters; accordingly, when the central frequency difference falls within the first interval, using the first set of parameters for the BT transmission of the BT transceiver 120 can prevent the wireless reception/transmission of the wireless transceiver 110 from being severely influenced, and when the central frequency difference falls within the second interval, using the second set of parameters for the BT transmission of the BT transceiver 120 can prevent the transmission signal of the BT transceiver 120 from being excessively reduced, and this can increase the reception success rate of a far-end BT device (i.e., the link partner of the BT transceiver 120).

Please refer to FIGS. 1, 3, and 4. In regard to the control of BT transmission, the BT controller 130 can control the BT transceiver 120 to use one of the N sets of parameters in accordance with the difference between the central frequency of the wireless channel $CH_{WLAN}$ and the central frequency of the second BT channel $CH_{BT2}$. Since people having ordinary skill in the art can appreciate the way of the BT controller 130 making the BT transceiver 120 use one of the N sets of parameters according to the disclosure in the preceding paragraph, repeated and redundant description is omitted here. It should be noted that N sets of parameters for the coexistence between the BT transmission and the wireless reception can be the same as or different from N sets of parameters for the coexistence between the BT transmission and the wireless transmission. It should also be noted that although FIGS. 2, 3, 5, and 6 show that the central frequency of the wireless channel is higher than the central frequency of the BT channel, this is just exemplary for understanding; in other embodiments, the central frequency of the BT channel can be higher than the central frequency of the wireless channel. In light of the above, provided the absolute value of the difference between the central frequency of the wireless channel and the central frequency of the BT channel is unchanged, the condition "the central frequency of the wireless channel being higher than the central frequency of the BT channel" and the condition "the central frequency of the wireless channel being lower than the central frequency of the BT channel" can be taken to be the same condition related to the same interval of the N predetermined intervals and to the same set of parameters, or can be taken to be different conditions related to different intervals of the N predetermined intervals and to different sets of parameters.

Please refer to FIGS. 1, 2, and 4. In regard to the control of BT reception, if the difference between the central frequency of the wireless channel $CH_{WLAN}$ and the central frequency of the first BT channel $CH_{BT1}$ falls within a first interval of the N predetermined frequency intervals, the BT controller 130 controls the BT transceiver 120, especially the BT receiver 420 of the BT transceiver 120, to use a first set of parameters (e.g., the parameters for setting the automatic gain control of the BT receiver 420) among the N sets of parameters; and if the difference between the central frequency of the wireless channel $CH_{WLAN}$ and the central frequency of the first BT channel $CH_{BT1}$ falls within a second interval of the N predetermined frequency intervals, the BT controller 130 controls the BT transceiver 120, especially the BT receiver 420 of the BT transceiver 120, to use a second set of parameters (e.g., the parameters for setting the automatic gain control of the BT receiver 420) among the N sets of parameters. It should be noted that the difference between any frequency in the first interval and the central frequency of the wireless channel $CH_{WLAN}$ is smaller than the difference between any frequency in the second interval and the central frequency of the wireless channel $CH_{WLAN}$ as shown in FIGS. 5-6; in other words, any frequency in the second interval is farther from the central frequency of the wireless channel $CH_{WLAN}$ than any frequency in the first interval is. In addition, a reception signal amplification gain of the BT transceiver 120 using the first set of parameters is smaller than a reception signal amplification gain of the BT transceiver 120 using the second set of parameters; accordingly, when the difference (hereafter, the central frequency difference) between the central frequency of the wireless channel $CH_{WLAN}$ and the central frequency of the current BT channel (i.e., any of the aforementioned plurality of BT channels) falls within the first interval, using the first set of parameters for the BT reception operation of the BT transceiver 120 can prevent the sensitivity of the BT reception operation from being too high so as to prevent the signal interference caused by the wireless transmission of the wireless transceiver 110 from being excessively amplified, and when the central frequency difference falls within the second interval, using the second set of parameters for the BT reception operation of the BT transceiver 120 can prevent the sensitivity of the BT reception operation from being too low so as to increase the reception success rate of the BT transceiver 120.

Please refer to FIGS. 1, 3, and 4. In regard to the control of BT reception, the BT controller 130 can control the BT transceiver 120 to use one of the N sets of parameters in accordance with the difference between the central frequency of the wireless channel $CH_{WLAN}$ and the central frequency of the second BT channel $CH_{BT2}$. Since people having ordinary skill in the art can appreciate the way of the BT controller 130 making the BT transceiver 120 use one of the N sets of parameters according to the disclosure in the preceding paragraph, repeated and redundant description is omitted here. It should be noted that N sets of parameters for the coexistence between the BT reception and the wireless transmission can be the same as or different from N sets of parameters for the coexistence between the BT transmission and the wireless transmission/reception.

It should be noted that the exchange of operation states (including the central frequency information of a selected channel) between the BT transceiver 120 and the wireless transceiver 110 can be realized with a known or self-developed technique (e.g., the technique disclosed in the applicant's TW patent application 107100083; a conventional firmware/hardware communication technique for obtaining the operation state; a conventional detection technique for obtaining the information of the channel selected by the wireless transceiver 110), and thus the detail of how to exchange operation states is omitted here. It should also be noted that the wireless transceiver 110 will not frequently change the channel for communicating with the wireless device 10 if the current wireless environment is stable, and thus in the aforementioned embodiments the wireless transceiver 110 usually use the same wireless channel $CH_{WLAN}$ to communicate with the wireless device 10. However, even though the wireless transceiver 110 firstly use the wireless channel $CH_{WLAN}$ to communicate with the wireless device 10 in the period of time and then use another wireless channel to communicate with the wireless device 10, the BT controller 130 still controls the BT transceiver 120 according to the central frequency of the original wireless channel $CH_{WLAN}$ without considering the central frequency of the another wireless channel before the BT controller 130 is informed of the channel update; afterward, the BT controller 130 will receive the information about the update of the communication channel between the wireless transceiver 110 and the wireless device 10, and then the BT controller 130 will control the BT transceiver 120 according to the update information.

It should be noted that people of ordinary skill in the art can selectively use some or all of the features of any embodiment in this specification or selectively use some or all of the features of multiple embodiments in this specification to implement the present invention as long as such implementation is practicable; in other words, the present invention can be carried out flexibly in accordance with the present disclosure.

To sum up, the wireless communication device of the present disclosure can adaptively adjust the parameters for BT transceiver according to the central frequency difference between a wireless channel and a BT channel. Therefore, the wireless communication device of the present disclosure can not only mitigate the interference caused by WLAN communication but also increase the success rate of BT communication.

The aforementioned descriptions represent merely the preferred embodiments of the present invention, without any intention to limit the scope of the present invention thereto. Various equivalent changes, alterations, or modifications based on the claims of present invention are all consequently viewed as being embraced by the scope of the present invention.

What is claimed is:

1. A device comprising:
a wireless transceiver configured to perform wireless communication via a wireless channel in a period of time, the wireless transceiver supporting at least one wireless communication standard;
a Bluetooth (BT) transceiver configured to perform BT communication via a plurality of BT channels in order in the period of time, the plurality of BT channels including a first BT channel and a second BT channel; and
a BT controller configured to control the BT transceiver to use one of N sets of parameters, if the BT controller determines that during the period of time that the BT transceiver is performing the BT communication via a current BT channel, a difference between a central frequency of the wireless channel and a central frequency of the current BT channel falls within one of N predetermined frequency intervals, the current BT channel being one of the first BT channel and the second BT channel,
wherein the wireless transceiver and the BT transceiver use a same frequency band for communication simultaneously in the period of time, and the N is an integer greater than one.

2. The device of claim 1, wherein if the difference between the central frequency of the wireless channel and the central frequency of the first BT channel falls within a first frequency interval of the N predetermined frequency intervals, the BT controller controls the BT transceiver to use a first set of parameters among the N sets of parameters; and if the difference between the central frequency of the wireless channel and the central frequency of the first BT channel falls within a second frequency interval of the N predetermined frequency intervals, the BT controller controls the BT transceiver to use a second set of parameters among the N sets of parameters; a difference between any frequency in the first frequency interval and the central frequency of the wireless channel is less than a difference between any frequency in the second frequency interval and the central frequency of the wireless channel; and strength of a transmission signal of the BT transceiver using the first set of parameters is weaker than strength of a transmission signal of the BT transceiver using the second set of parameters.

3. The device of claim 2, wherein the BT transceiver includes a BT transmitter; if the difference between the central frequency of the wireless channel and the central frequency of the first BT channel falls within the first frequency interval during the period of time that the wireless transceiver performs a wireless reception operation and the BT transceiver performs a BT transmission operation, the BT controller controls the BT transmitter to use the first set of parameters to adjust the strength of the transmission signal of the BT transceiver; and if the difference between the central frequency of the wireless channel and the central frequency of the first BT channel falls within the second frequency interval during the period of time that the wireless transceiver performs the wireless reception operation and the BT transceiver performs the BT transmission operation, the BT controller controls the BT transmitter to use the second set of parameters to adjust the strength of the transmission signal of the BT transceiver.

4. The device of claim 2, wherein the BT transceiver includes a BT transmitter; if the difference between the central frequency of the wireless channel and the central frequency of the first BT channel falls within the first frequency interval during the period of time that the wireless transceiver performs a wireless transmission operation and the BT transceiver performs a BT transmission operation, the BT controller controls the BT transmitter to use the first set of parameters to adjust the strength of the transmission signal of the BT transceiver; and if the difference between the central frequency of the wireless channel and the central frequency of the first BT channel falls within the second frequency interval during the period of time that the wireless transceiver performs the wireless transmission operation and the BT transceiver performs the BT transmission operation, the BT controller controls the BT transmitter to use the second set of parameters to adjust the strength of the transmission signal of the BT transceiver.

5. The device of claim 1, wherein if the difference between the central frequency of the wireless channel and the central frequency of the first BT channel falls within a first frequency interval of the N predetermined frequency intervals, the BT controller controls the BT transceiver to use a first set of parameters among the N sets of parameters; and if the difference between the central frequency of the wireless channel and the central frequency of the first BT channel falls within a second frequency interval of the N predetermined frequency intervals, the BT controller controls the BT transceiver to use a second set of parameters among the N sets of parameters; a difference between any frequency in the first frequency interval and the central frequency of the wireless channel is less than a difference between any frequency in the second frequency interval and the central frequency of the wireless channel; and an amplification gain of a reception signal of the BT transceiver using the first set of parameters is lower than an amplification gain of a reception signal of the BT transceiver using the second set of parameters.

6. The device of claim 5, wherein the BT transceiver includes a BT receiver; if the difference between the central frequency of the wireless channel and the central frequency of the first BT channel falls within the first frequency interval during the period of time that the wireless transceiver performs a wireless transmission operation and the BT transceiver performs a BT reception operation, the BT controller controls the BT receiver to use the first set of parameters to adjust the amplification gain of the reception signal of the BT transceiver; and if the difference between the central frequency of the wireless channel and the central frequency of the first BT channel falls within the second frequency interval during the period of time that the wireless transceiver performs the wireless transmission operation and the BT transceiver performs the BT reception operation, the BT controller controls the BT receiver to use the second set of parameters to adjust the amplification gain of the reception signal of the BT transceiver.

7. The device of claim 1, wherein the same frequency band is a 2.4 GHz band of Industrial Scientific Medical (ISM) bands.

8. The device of claim 1, wherein each set of the N sets of parameters includes at least one of following parameters: an amplification gain parameter for a BT transmitter of the BT transceiver; and an automatic gain control (AGC) parameter for a BT receiver of the BT transceiver.

9. The device of claim 1, wherein the wireless transceiver, the BT transceiver, and the BT controller are included in a single integrated circuit.

10. The device of claim 1, wherein if the difference between the central frequency of the wireless channel and the central frequency of the second BT channel falls within a first frequency interval of the N predetermined frequency intervals, the BT controller controls the BT transceiver to use a first set of parameters among the N sets of parameters; and if the difference between the central frequency of the wireless channel and the central frequency of the second BT channel falls within a second frequency interval of the N predetermined frequency intervals, the BT controller controls the BT transceiver to use a second set of parameters among the N sets of parameters; a difference between any frequency in the first frequency interval and the central frequency of the wireless channel is less than a difference between any frequency in the second frequency interval and the central frequency of the wireless channel; and strength of a transmission signal of the BT transceiver using the first set of parameters is weaker than strength of a transmission signal of the BT transceiver using the second set of parameters.

11. The device of claim 10, wherein the BT transceiver includes a BT transmitter; if the difference between the central frequency of the wireless channel and the central frequency of the second BT channel falls within the first frequency interval during the period of time that the wireless transceiver performs a wireless reception operation and the BT transceiver performs a BT transmission operation, the BT controller controls the BT transmitter to use the first set of parameters to adjust the strength of the transmission signal of the BT transceiver; and if the difference between the central frequency of the wireless channel and the central frequency of the second BT channel falls within the second frequency interval during the period of time that the wireless transceiver performs the wireless reception operation and the BT transceiver performs the BT transmission operation, the BT controller controls the BT transmitter to use the second set of parameters to adjust the strength of the transmission signal of the BT transceiver.

12. The device of claim 10, wherein the BT transceiver includes a BT transmitter; if the difference between the central frequency of the wireless channel and the central frequency of the second BT channel falls within the first frequency interval during the period of time that the wireless transceiver performs a wireless transmission operation and the BT transceiver performs a BT transmission operation, the BT controller controls the BT transmitter to use the first set of parameters to adjust the strength of the transmission signal of the BT transceiver; and if the difference between the central frequency of the wireless channel and the central frequency of the second BT channel falls within the second frequency interval during the period of time that the wireless transceiver performs the wireless transmission operation and the BT transceiver performs the BT transmission operation, the BT controller controls the BT transmitter to use the second set of parameters to adjust the strength of the transmission signal of the BT transceiver.

13. The device of claim 1, wherein if the difference between the central frequency of the wireless channel and the central frequency of the second BT channel falls within a first frequency interval of the N predetermined frequency intervals, the BT controller controls the BT transceiver to use a first set of parameters among the N sets of parameters; and if the difference between the central frequency of the wireless channel and the central frequency of the second BT channel falls within a second frequency interval of the N predetermined frequency intervals, the BT controller controls the BT transceiver to use a second set of parameters among the N sets of parameters; a difference between any frequency in the first frequency interval and the central frequency of the wireless channel is less than a difference between any frequency in the second frequency interval and the central frequency of the wireless channel; and an amplification gain of a reception signal of the BT transceiver using the first set of parameters is lower than an amplification gain of a reception signal of the BT transceiver using the second set of parameters.

14. The device of claim 13, wherein the BT transceiver includes a BT receiver; if the difference between the central frequency of the wireless channel and the central frequency of the second BT channel falls within the first frequency interval during the period of time that the wireless transceiver performs a wireless transmission operation and the BT transceiver performs a BT reception operation, the BT controller controls the BT receiver to use the first set of parameters to adjust the amplification gain of the reception signal of the BT transceiver; and if the difference between the central frequency of the wireless channel and the central frequency of the second BT channel falls within the second frequency interval during the period of time that the wireless transceiver performs the wireless transmission operation and the BT transceiver performs the BT reception operation, the BT controller controls the BT receiver to use the second set of parameters to adjust the amplification gain of the reception signal of the BT transceiver.

15. The device of claim 1, wherein the N is equal to or greater than three.

* * * * *